United States Patent

[11] 3,588,146

| | | | | | |
|---|---|---|---|---|---|
| [72] | Inventor | Marion R. Haddox<br>1112 12th St., Parker, Ariz. 85344 | 2,845,281 | 7/1958 | Holder et al. ................... 280/478(.2) |
| [21] | Appl. No. | 803,835 | 2,904,116 | 9/1959 | Wessendorf.................... 172/275 |
| [22] | Filed | Mar. 3, 1969 | 3,279,819 | 10/1966 | Edmonds...................... 280/478(.2) |
| [45] | Patented | June 28, 1971 | 3,437,355 | 4/1969 | Jeffes ........................... 280/478(.2) |

*Primary Examiner*—Leo Friaglia
*Attorney*—White and Haefliger

[54] TRUCK AND TRAILER CONNECTOR
3 Claims, 8 Drawing Figs.

[52] U.S. Cl. ........................................ 280/478,
                                           280/504
[51] Int. Cl. ........................................ B60d 1/04
[50] Field of Search ............................ 280/478,
                                   478(.2), 504, 477; 172/275

[56]                References Cited
                  UNITED STATES PATENTS
2,453,139  11/1948  Kleinkort ..................... 280/504

ABSTRACT: The invention provides a heavy-duty truck and trailer connector employing a rectangularly tubular bar terminally carrying a coupling and accommodated for longitudinal and lateral movements within a trailer-suspended mounting which supports also a fluid powered bar-locking unit, the bar having associated wedge guide means for alignment of the bar from lateral positions, and the coupling having a movable latch element actuable by a second fluid-powered unit.

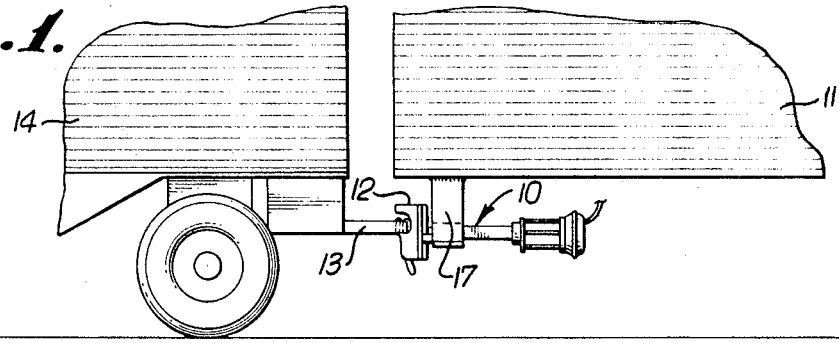
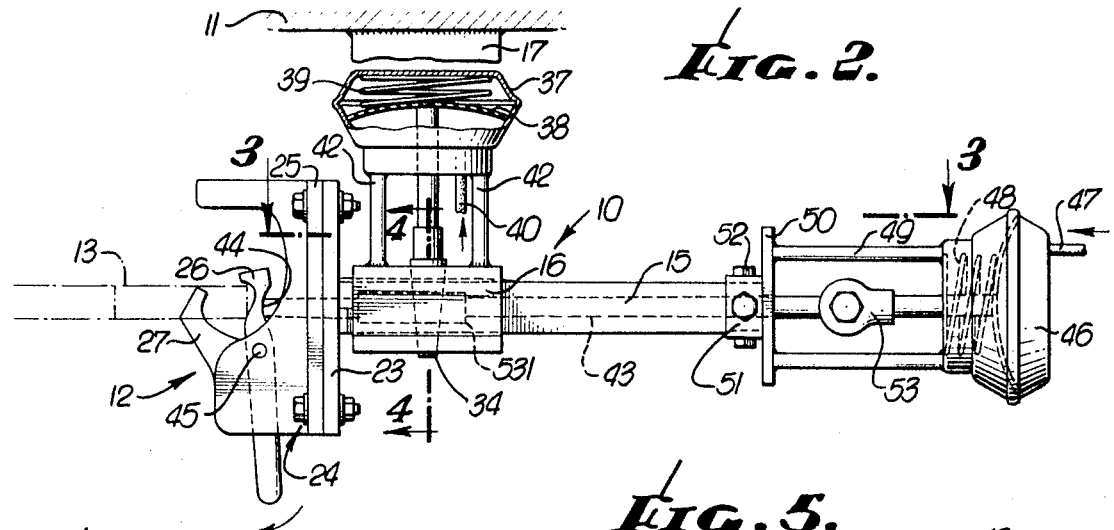
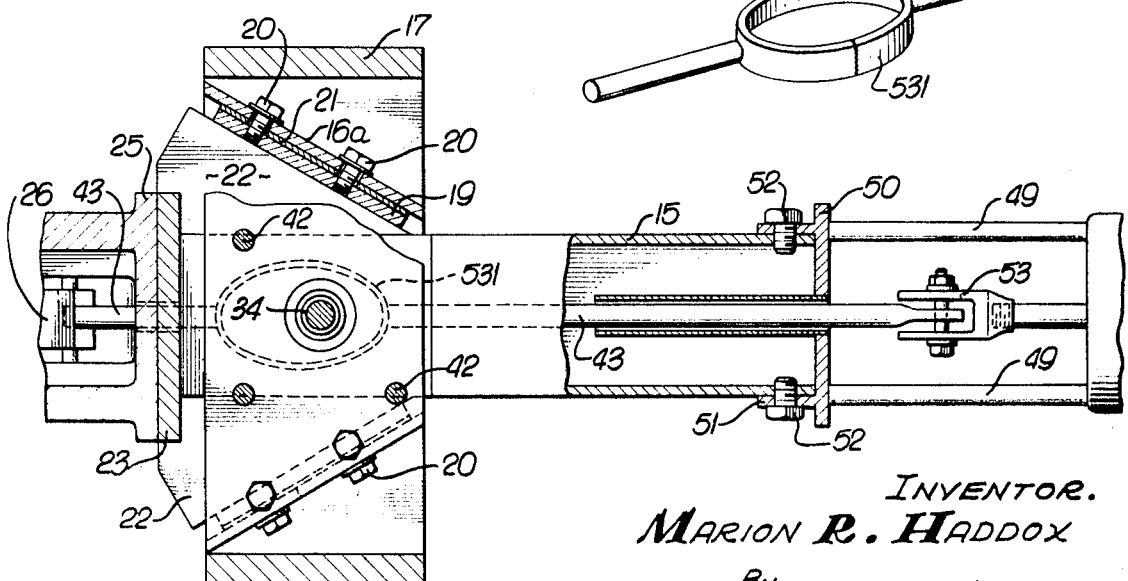

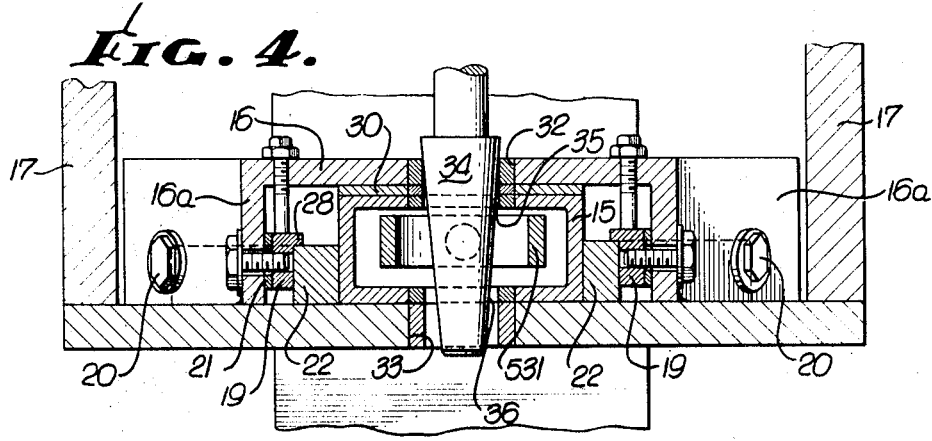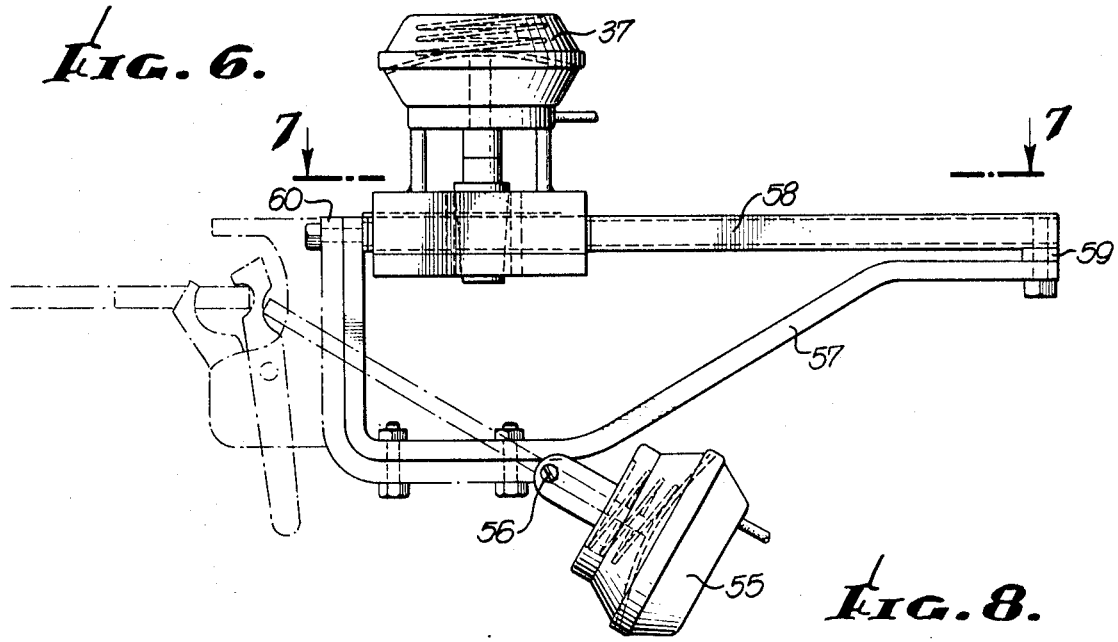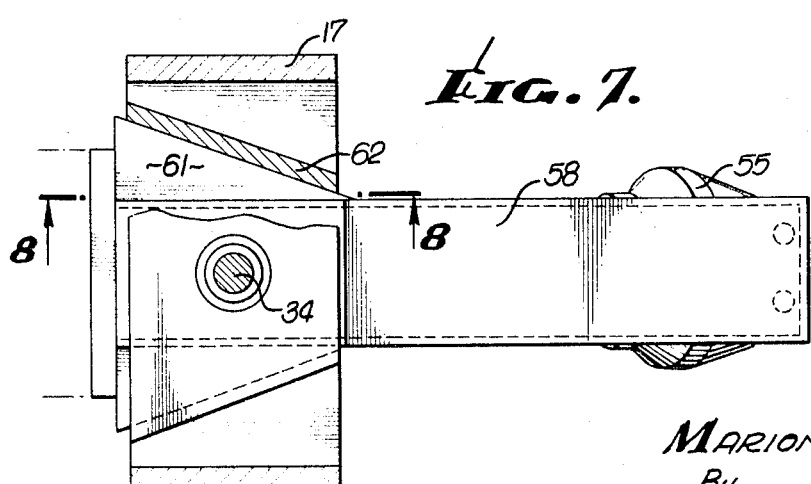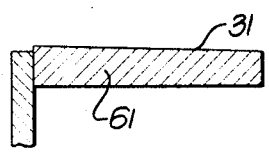

TRUCK AND TRAILER CONNECTOR

SUMMARY OF THE INVENTION

This invention has to do with truck and trailer connector assemblies designed for heavy-duty service and having various features rendering the assembly capable of reliable performance in such service.

Generally considered, the invention employs a truck-mounted drawbar for latched association with a coupling terminally carried by a trailer mounted tubular bar capable of both longitudinal and lateral movements in the course of effecting coupled connection with the truck drawbar. Employed in direct association with the trailer-mounted tubular bar is a positively acting, fluid-powered unit serving to lock the bar against movement from its truck-coupling position. Also associated with the bar is a second fluid-powered unit operatively associated with a movable latch component of the coupling. Thus the assembly is basically of simple rugged construction and its working parts are so designed as to have assured trouble-free performance.

In furtherance of the objective of assuring adequate strength under both pulling and impact loads, the trailer-mounted tubular bar is made rectangular in cross section for movement within an open end housing which confines the bar by flat surface interengagements against appreciable vertical displacements while allowing lateral bar movements for alignment of the coupling with the truck drawbar. As is commonly experienced, exact truck-trailer alignment presents difficulties in effecting the coupling, hence the capacity given the bar for lateral movements within the housing confinement. Longitudinal movability of the bar is utilized to return the bar to axial alignment with the housing by wedge action resulting from guided movement of wedge projections on the sides of the bar within correspondingly angular guide means rigidly contained within the housing.

The structure characterized thus far adapts to suspension from the bottom of the trailer by a U-shaped bracket which supports both the housing and a fluid-powered unit mounted thereon and operating to project a locking pin downwardly through openings in the bar.

The various features and objects of the invention, as well as the details of illustrative embodiments, will be understood more fully from the following description of the accompanying drawings, in which

BRIEF DESCRIPTION OF THE DRAWINGS

FIG. 1 is a general illustration showing the coupling assembly connected to a truck drawbar;

FIG. 2 is a view showing the connector assembly in side elevation and in locked condition;

FIG. 3 is a fragmentary sectional enlargement taken on line 3-3 of FIG. 2;

FIG. 4 is a transverse further enlarged section on line 4-4 of FIG. 2;

FIG. 5 is a showing in perspective of a terminal extent of the latch-actuating rod;

FIG. 6 is a view similar to FIG. 2 showing a variational form of the invention;

FIG. 7 is a sectional plan taken on line 7-7 of FIG. 6; and

FIG. 8 is a fragmentary cross section on line 8-8 of FIG. 7.

DESCRIPTION OF THE PREFERRED EMBODIMENTS

In reference first to FIG. 1, the connector assembly generally indicated at 10 is shown to be mounted underneath a trailer 11 and coupled at 12 to the drawbar 13 of a pulling vehicle such as truck 14.

According to the more detailed showing of FIG. 2 the assembly 10 is shown to comprise a tubular bar 15 of rectangular cross section, see FIG. 4, accommodated for longitudinal reciprocating and lateral swinging movements within a housing 16 integrally associated with U-shaped bracket 17 secured to the bottom of the trailer 11. In reference to FIG. 3 it will be noted that the sides 16a of the housing are convergent rearwardly of the assembly at angularities corresponding to the internal guides 19 mounted to the sides 16a as by screws 20, thus providing attachments accessible through the rear open end of the housing. In order to assure proper exactness in the wedge engagement of the bar-carried wedges with the guide plates 19, as well as to compensate for wear in service, shims 21 may be interposed between plates 19 and the housing sides 16a to be tightly confined by the screws 20. Bar 15 carries a pair of lateral rearwardly convergent wedge projections 22 which are retractable with the bar from forward positions of lateral movability of the bar, into the FIG. 3 position of locked engagement with the housing-supported wedges. As illustrated, the bar wedges 22 may be formed integrally with flange 23 carried by the bar and connected at 24 to the forward section 25 of the coupling 12.

At this point it may be mentioned that the coupling 12 may be of any of various designs employing a movable latch element cooperative with a spaced keeper to connect with the drawbar 13. Merely as illustrative, the coupling is shown to comprise a pivoted latch element 26 movable toward or away from the keeper 27 into locked and released association with the drawbar 13. And as will appear, the latch element also is adaptable to association with an actuating rod accommodated as in either FIGS. 2 or 6.

The bar 15 may be restrained against vertical movement or looseness in any of various ways including the provision of holddown shoulders at 28 on the wedge shoes 19 and overlapping the wedge projections 22, as well as by the interposition of a wear plate or shim 30 between the bar and top of the housing 16. Vertical tightness may additionally be favored by tapering the upper surfaces of wedge projections 22, as indicated at 31 in FIG. 8, with corresponding angularity given the undersurfaces of the holddown pieces at 28. Further in reference to FIG. 4, the housing 16 has aligned openings at 32 and 33 for reception of a tapered locking pin 34 projectable into and out of the bar openings at 35 and 36 by actuation of the fluid-powered unit 37. The pin-receiving housing and bar openings may be aligned as illustrated with wear-resistant bushings.

The locking device at 37 is shown to comprise a diaphragm or piston 38 operatively associated with the locking pin 34 and displaceable upwardly against the resistance of spring 39 by fluid pressure communicated to the underside of the diaphragm or piston through inlet 40. FIG. 2 illustrates the pin 34 in downwardly projected, bar-locking position from which the pin is retractable upwardly against the spring thrust by fluid pressure from line 40, upon relief of which the pin is thrust down by the spring action. As illustrated, the unit 37 is compactly accommodated between the arms of bracket 17 in being mounted as upon legs 42 secured to the housing 16.

The latch element 26 is actuated by a rod 43 extending through the bar 15 to terminally bear at 44 against the latch above its pivot 45. This latch-actuating rod may be mounted according to the FIG. 2 form by a second fluid-powered unit 46 to which fluid pressure is communicated via connection 47 to displace the rod against the resistance of spring 48. The unit 46 is accommodated for bodily movement with bar 15 as by connections 49 with flange 50 on collar 51 secured by screws 52 to the end of the bar. Pivotal coupling 53 assures flexibility in the thrust transmission to the latch element. The latter thus is thrust toward keeper 27 to retain the drawbar 13 by fluid pressure communicated to the unit 46, and the latch is freed for retraction by spring 48 upon fluid pressure release. The rod 43 is formed with an intermediate loop 53l, see FIG. 5, for shiftable clearance about the locking pin 34.

In considering the operation of the connector, assume the truck 14 to be backed toward the trailer 11 in a position away from exact alignment. Rearward movement of the truck brings the tubular bar wedges 22 between the housing guides and ultimately the bar and coupling 12 into exact axial alignment with the housing. During such movements the retracted locking pin 34 may ride the surface of bar 15 until its openings 35 and 36 are brought into such alignment with the pin as will enable the latter to automatically be thrust by the action of spring 39. As will be understood, initially to effect the truck drawbar connection the latch 26 will have been thrust forward by fluid pressure delivery to the unit 46.

FIGS. 6 to 8 illustrate a variational form of the invention in which the latch-actuating unit 55 corresponds in function to the described unit 46 is mounted at 56 on bracket 57 depending from the tubular bar 58 corresponding to bar 15, the bracket being terminally connected to the bar at 59 and 60 so as to be shiftable, along with unit 55, with the bar. The bar-carried wedge projections 61 function as previously described by guidance between the convergent sidewalls 62 of the housing. The details of FIG. 4 are shown to be reduced to more simple form by direct engagement of the bar wedges with the housing wall and providing for takeup of the bar structure against vertical looseness by tapering the top surfaces of the wedges as at 31 with corresponding taper given the engaging inner under surfaces of the housing.

I claim:

1. A truck and trailer connector assembly comprising a tubular rectangular cross section bar, means mounting the bar for longitudinal and lateral reciprocating movements including an open end housing through which said bar extends, a coupling including a movable latch element terminally carried by said bar, wedge-shaped projections on the sides of the bar, correspondingly angular guide means carried by said mounting means and adapted to receive said projections, first fluid-powered means operable to releasably lock the bar against movement from between said guide means, and second fluid powered means operatively connected to said latch element, said housing containing a pair of convergent supports for said guide means, and means for removably mounting said guide means within the housing.

2. A connector assembly according to claim 1, including a wear plate interposed between the top of said bar and the housing.

3. A connector assembly according to claim 1, including also replaceable shims interposed between said projections and supports.